(12) United States Patent
Satoh (10) Patent No.: US 6,383,362 B2
(45) Date of Patent: May 7, 2002

(54) PROCESS AND APPARATUS FOR ELIMINATING DIOXINS

(76) Inventor: Yukimasa Satoh, 5-22, Jindaiji-higashimachi 6-chome, Chofu-shi, Tokyo (JP)

( * ) Notice: Subject to any disclaimer, the term of this patent is extended or adjusted under 35 U.S.C. 154(b) by 0 days.

(21) Appl. No.: 09/725,454

(22) Filed: Nov. 30, 2000

(30) Foreign Application Priority Data

Dec. 9, 1999 (JP) .......................................... 11-350323

(51) Int. Cl.[7] ................................................ C02F 1/461

(52) U.S. Cl. ....................... 205/688; 205/742; 205/760; 205/761; 204/242; 204/292; 204/293; 204/294; 588/204

(58) Field of Search ................................. 205/688, 742, 205/760, 761; 204/242, 292, 293, 294; 588/204

(56) References Cited

U.S. PATENT DOCUMENTS 5,108,563 A * 4/1992 Cook .......................... 205/688

* cited by examiner

Primary Examiner—Arun S. Phasge
(74) Attorney, Agent, or Firm—Lurusso & Loud (57) ABSTRACT

Dioxins are eliminated from soot by conversion into oil and water. A gas stream of smoke and dioxin-entraining ash is passed through a curtain of water in a separator to separate the dioxin-entraining ash from the gas stream. The ash-water mixture is separated by a centrifuge, the separated ash is mixed with water and the mixture is again separated by a centrifuge into ash and an emulsion-like oil-water mixture in which dioxins are dissolved. This separated ash is also washed with water and the various wash waters and the dioxin-containing oil-water mixture are admixed and electrolyzed in a primary electrolyzer equipped with a carbon anode and a stainless steel cathode to decompose the dioxin components. The remaining aqueous liquid is electrolyzed in a secondary electrolyzer with an aluminum anode and a stainless steel cathode to generate hydrogen by electrolysis of water and metal hydroxides by electrolysis of aluminum.

10 Claims, 4 Drawing Sheets

POLYCHLORODIBENZOFURANS
(PCDFs, ALSO COMMONLY KNOWN AS DIOXINS)

POLYCHLORODIBENZO-p-DIOXINS
(PCDDs, COMMONLY KNOWN AS DIOXINS)

PROCESS AND APPARATUS FOR ELIMINATING DIOXINS

BACKGROUND OF THE INVENTION

1. Field of the Invention

This invention relates to a process and apparatus for eliminating dioxins which are discharged through incinerator chimneys and are regarded as hazardous to the health of animals and humans, hence are of world and national concern.

2. Description of the Prior Art

The chimneys of refuse incinerator plants, where packaging materials and other articles made of vinyl or like plastic materials, which are petrochemical products, are incinerated, together with domestic refuse, may discharge dioxin-containing smoke.

When heated in refuse incinerators, vinyl chloride-based plastics in the form of refuse soften and then begin to melt at 300° C. to 400° C. and, at higher temperatures, the combustion thereof begins. The combustion temperature further rises and arrives at about 800° C., which is approximately the upper limit.

At 300° C. to 500° C., namely prior to the start of combustion of vinyl chloride-based plastics, dioxins are formed and the dioxins formed in that former stage of incineration adhere to the ash, namely residue left after burning, formed in the later stage.

Dioxins adhere to the incineration ash and, thus, soot itself contains dioxins. Such soot settles on the surroundings of the refuse incineration plant site, causing a social problem.

Soot containing dioxins adhering to and entrained by the incineration ash has a relatively heavy weight because it contains chlorine compounds. The soot does not diffuse far away but rather falls down on the surroundings of the refuse incineration plant site, resulting, day by day, in accumulation thereof to an increased concentration.

Dioxins are also called environmental hormones or endocrine disrupters. Namely, they may cause mutation of certain genes of animals and plants and, according to some theories, they may cause cancer in humans.

From the viewpoint of natural environment protection and environmental pollution prevention, it has recently been recommended that the combustion temperature in the refuse incinerator should be raised to about 1,500° C., since dioxins are formed at refuse incinerator combustion temperatures of 800° C. and below.

However, for raising the refuse incinerator combustion temperature from 800° C. to about 1,500° C., it is necessary to build incinerators newly because the existing refuse incinerators are not fire-resistant at such a high temperature.

The cost of newly building an incinerator is immense. An incinerator with a capacity of 500,000 tons per day, for instance, will cost about 5 billion yen, presenting a difficult problem to local governments.

Refuse is discharged daily and, when it is incinerated in conventional refuse incinerators, dioxins are generated. Citizens good sense is thus expected so that plastics and like packaging materials may not be mixed with raw refuse. As a matter of fact, however, such expectation by itself has failed to lead to any ultimate solution.

A refuse incinerator where the combustion temperature can be raised from 800° C. to about 1,000° C. may be constructed at a reduced cost and can discharge harmless smoke alone into the atmosphere through its chimney while removing incineration ash through a water curtain. However, dioxins remain adhering to the dehydrated ash resulting from separation of the muddy water composed of water-entrapped ash and water into ash and water by means of a dehydrator, and an extra cost is required for the treatment of that ash and, after all, no complete removal of the toxicity of dioxins has been realized.

The present invention is to solve the above problems and provide a process and apparatus for eliminating dioxins almost completely from soot containing dioxins adhering to incineration ash in a simple and easy manner and at low cost.

Another object of the invention is to eliminate dioxins while causing refuse incinerator chimneys to emit dioxin-free harmless smoke alone without newly constructing incinerators themselves.

SUMMARY OF THE INVENTION

To accomplish the above objects, the invention, in a first aspect thereof, provides a process for eliminating dioxins, which are generated from a refuse incinerator and have a structure such that two unit substances having a benzene nucleus are bound together via one or two oxygen atoms and at least one chlorine atom is bound to at least one benzene nucleus, from a mixed gas composed of smoke and ash carrying dioxins adhering thereto.

The above mixed gas is passed through a particulate matter separator, where the mixed gas passes through a water curtain. The dioxin-entraining ash is taken up in water and only harmless smoke thus separated alone is discharged into the atmosphere. The resulting mixture of water and dioxin-carrying ash is separated into dioxin-carrying ash and water in a separator. The dioxin-carrying ash separated in the above manner is washed with washing water, whereby the oleaginous dioxins entrained by the ash are eluted to give an emulsion-like oil-water mixture. The resulting mixture is separated, by means of a separator, into ash, which is now dioxin-free, and the emulsion-like oil-water mixture in which dioxins are dissolved. The dioxin-free ash is washed first with acidified water, then with alkaline washing water and further with neutral water, to give moist ash and aqueous washings; the ash is thus recovered. Separately, the water separated from the above-mentioned dioxin-carrying ash, the dioxin-containing emulsion-like oil-water mixture and the above washings are combined and admixed with a pH adjusting solution, to give a liquid mixture. This liquid mixture is electrolyzed in a primary electrolyzer equipped with an anode and a cathode, whereby dioxin components are decomposed into unit benzene nucleus substances, and a hydrogen atom(s) is(are) substituted for the chlorine atom(s) on the unit benzene nucleus substances. A harmless aromatic oil fraction and gaseous chlorine are formed in the upper layer and the aromatic oil fraction and gaseous chlorine are respectively separated and recovered. The dilute liquid mixture remaining after recovery of the aromatic oil fraction and gaseous chlorine and now mainly consisting of water is transferred to a secondary electrolyzer equipped with a metal anode and a metal cathode and electrolyzed therein to generate hydrogen at the cathode as a result of electrolysis of water and a metal hydroxide at the anode. The remaining trace amounts of dioxin components are decomposed into unit benzene nucleus substances, and a hydrogen atom(s) is(are) substituted for the chlorine atom(s) on the unit benzene nucleus substances, to give a harmless aromatic oil fraction and a trace amount of gaseous chlorine in the upper layer, and the harmless liquid aromatic oil fraction is separated and recovered. The above metal hydroxide takes up those substances that are contained in the dilute liquid mixture as w ell as the above-mentioned trace amount of gaseous chlorine and precipitates in the bottom layer. This precipitate is recovered and the middle layer electrolysis liquid is discharged.

In a second aspect, the invention, which is to achieve the objects mentioned above, provides an apparatus for eliminating dioxins, which are generated from a refuse incinerator and have a structure such that two unit substances having a benzene nucleus are bound together via one or two oxygen atoms and at least one chlorine atom is bound to at least one benzene nucleus, from a mixed gas composed of smoke and ash carrying dioxins adhering thereto. The above mixed gas is passed through a particulate matter separator, where the mixed gas passes through a water curtain. The dioxin-entraining ash is taken up in water and only the harmless smoke thus separated is discharged into the atmosphere. The resulting mixture of water and dioxin-carrying ash is sent to a first separator which separates the mixture into dioxin-carrying ash and water by centrifugal force. The dioxin-carrying ash thus separated is washed with washing water in a first tank to thereby elute the oleaginous dioxins entrained by the ash to give an emulsion-like oil-water mixture. The resulting mixture of the dioxin-free ash and the emulsion-like oil-water mixture containing dioxins dissolved therein is sent to a second separator and separated from each other by centrifugal force. Repeatedly using the first tank and second separator in that order, the dioxin-free ash is washed in sequence with acidified water, alkaline washing water and neutral water, each time followed by dehydration. The water separated from the above-mentioned dioxin-carrying ash, the dioxin-containing emulsion-like oil-water mixture and the respective washings are combined into an oil-water tank and admixed with a pH adjusting solution, to give a liquid mixture. This liquid mixture is transferred to a primary electrolyzer equipped with an anode and a cathode, and electrolyzed therein, whereby dioxin components are decomposed into unit benzene nucleus substances and a hydrogen atom(s) is(are) substituted for the chlorine atom(s) on the unit benzene nucleus substances. A harmless aromatic oil fraction and gaseous chlorine are formed in the upper layer. The aromatic oil fraction and gaseous chlorine are respectively separated and recovered by first and second recovery means. The dilute liquid mixture remaining after recovery of the aroma tic oil fraction and gaseous chlorine and now mainly consisting of water is transferred to a secondary electrolyzer equipped with an anode and a cathode and electrolyzed therein to generate hydrogen at the cathode as a result of electrolysis of water and a metal hydroxide at the anode; the remaining trace amounts of dioxin components are decomposed into unit benzene nucleus substances and a hydrogen atom(s) is(are) substituted for the chlorine atom(s) on the unit benzene nucleus substances, to give a harmless aromatic oil fraction and a trace amount of gaseous chlorine in the upper layer. The above metal hydroxide takes up the trace amount of substances that are still contained in the dilute liquid mixture as well as the above-mentioned trace amount of gaseous chlorine and precipitates in the bottom layer. The light aromatic oil fraction, now harmless, and the above metal hydroxide are separated and recovered by third and fourth recovery means, and the middle layer electrolysis liquid is discharged.

DETAILED DESCRIPTION OF THE PREFERRED EMBODIMENT

Embodiment 1

The invention is now described referring to the drawings.

Figure 1:
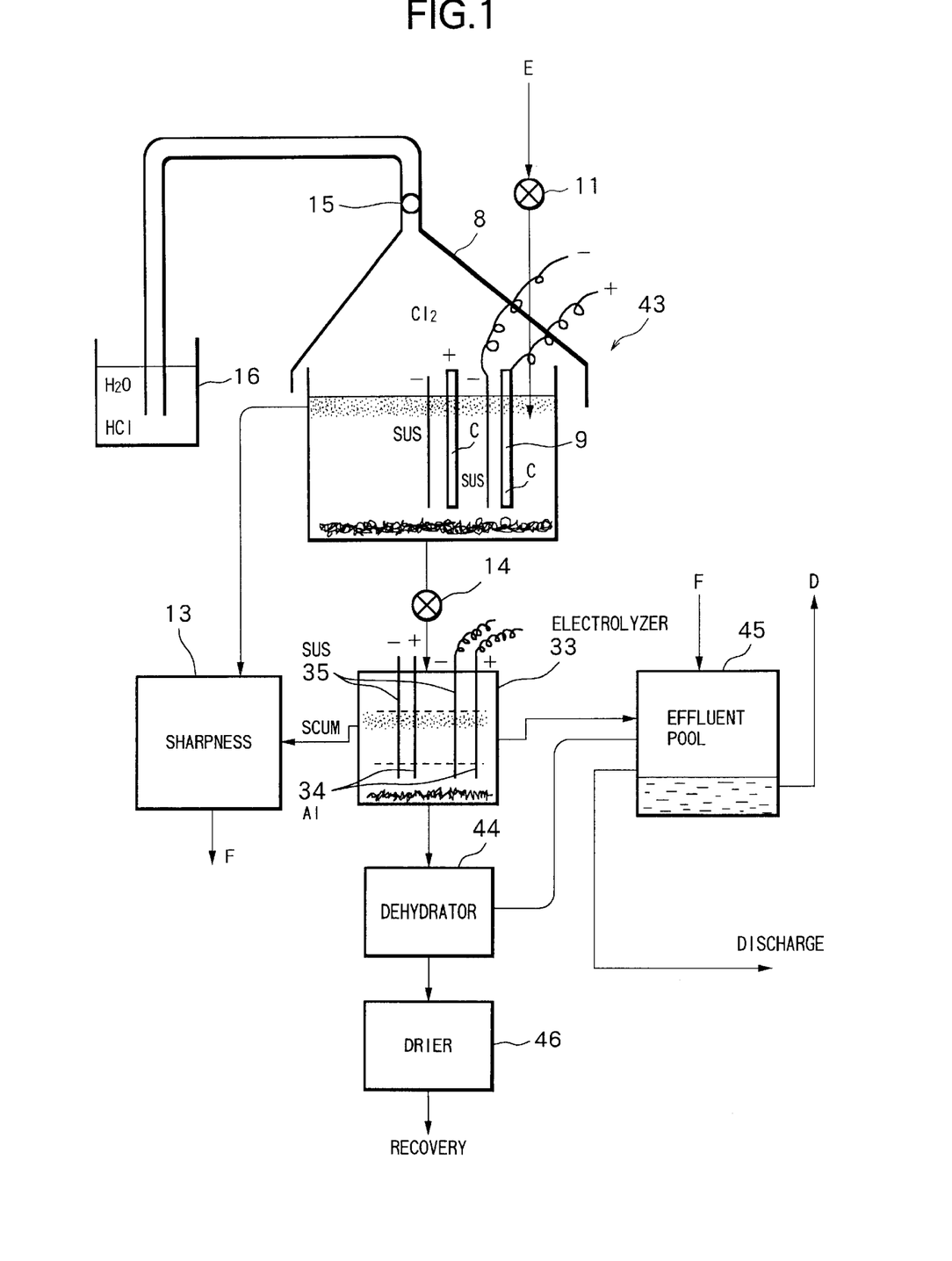
FIG. 1 is a block diagram showing the electrolyzer stage of an apparatus in which the process for eliminating dioxins according to the invention is to be carried out.
Figure 2:
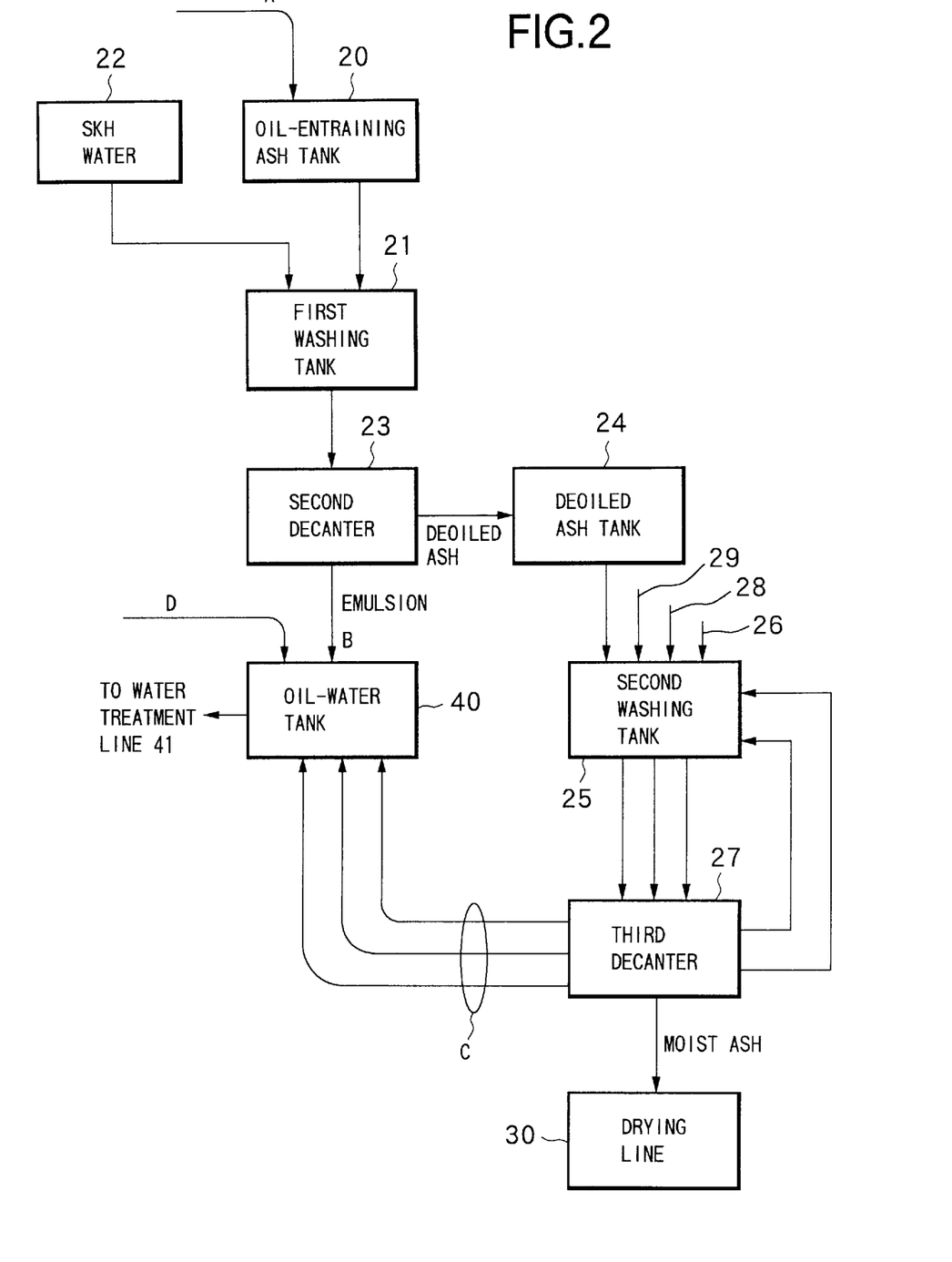
FIG. 2 is a block diagram showing the ash washing line of an apparatus in which the process for eliminating dioxins according to the invention is to be carried out.
Figure 3:
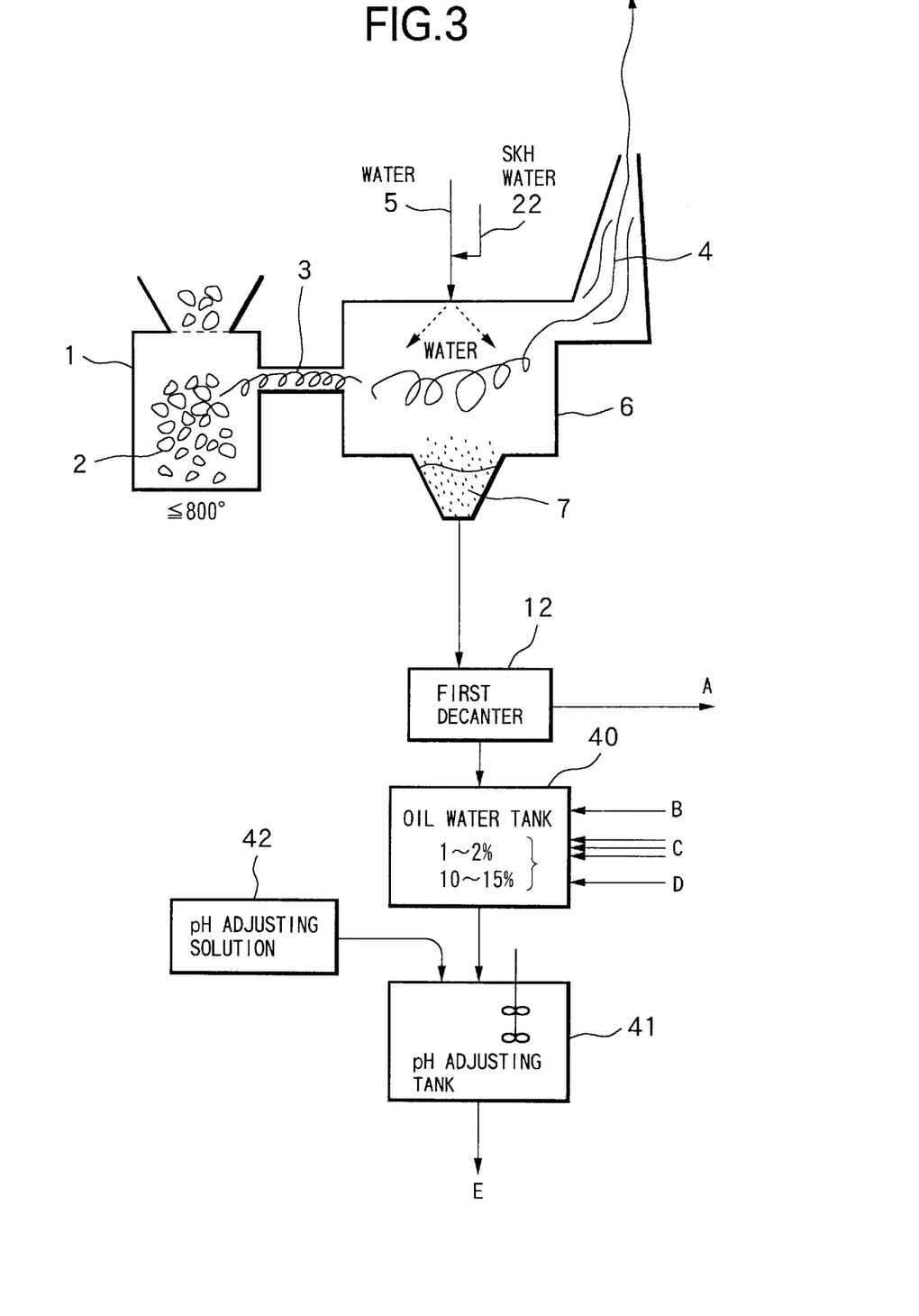
FIG. 3 is a block diagram showing the former stage, inclusive of a particulate matter remover, of an apparatus in which the process for eliminating dioxins according to the invention is to be carried out.

FIG. 1, FIG. 2 and FIG. 3 are block diagrams illustrating an embodiment of the apparatus for eliminating dioxins. Dioxins are eliminated while passing the apparatus in the order of FIG. 3, FIG. 2 and FIG. 1.

Referring to FIG. 3, a refuse incinerator 1 is charged with domestic refuse 2, inclusive of packaging materials made of vinyl and other plastics. The refuse is superheated and ignited from the bottom by means of a heavy oil burner or burners.

The domestic refuse 2 catches fire and burns at 750° C. to 800° C., and smoke 3 composed of a major proportion of combustion gas and a minor proportion of mist-like, dioxin-containing soot is sent to a particulate matter remover 6.

In the particulate matter remover 6, a curtain of water 5 flows down like falls from above according to a constitution known in the art. The smoke 3 composed of soot and so forth passes through this water 5. While the smoke 3 passes through the curtain of water 5, the fly ash fraction is washed off and the major proportion of combustion gas passes therethrough as it is.

The major proportion of combustion gas that has passed through the particulate matter remover 6 and has been deprived of dioxin-containing soot is now harmless and is discharged, as harmless smoke 4, into the atmosphere through a high chimney or the like.

The mist-like soot containing a relatively low dioxin concentration is entrapped by water. Thus, the soot containing dioxins that have stuck to the incineration ash, together with the water, collects in the lower pit of the particulate matter remover 6, now with an increased concentration.

The water 5 contains an appropriate amount of washing water (SKH water) 22 and this SKH water (oil catcher) 22 contains a solvent-like substance having a hydrophilic group readily binding to water and a lipophilic group readily binding to an oil.

At this stage, a part of the oily fraction (dioxins being substances of a kind of oil) entrained by the ash is bound to the lipophilic group of the SKH water 22, the ash itself is washed to a certain extent, and the adhering oil fraction migrates to the SKH water 22 to form an emulsion (emulsified oil).

It is also possible to perform the process without adding the washing water (SKH water) to the water 5 but causing the dioxin-containing ash alone to be entrapped to thereby remove the dioxins from the ash in the washing line to be mentioned later herein.

Now, the molecular structures of dioxins are explained.

Figure 4:
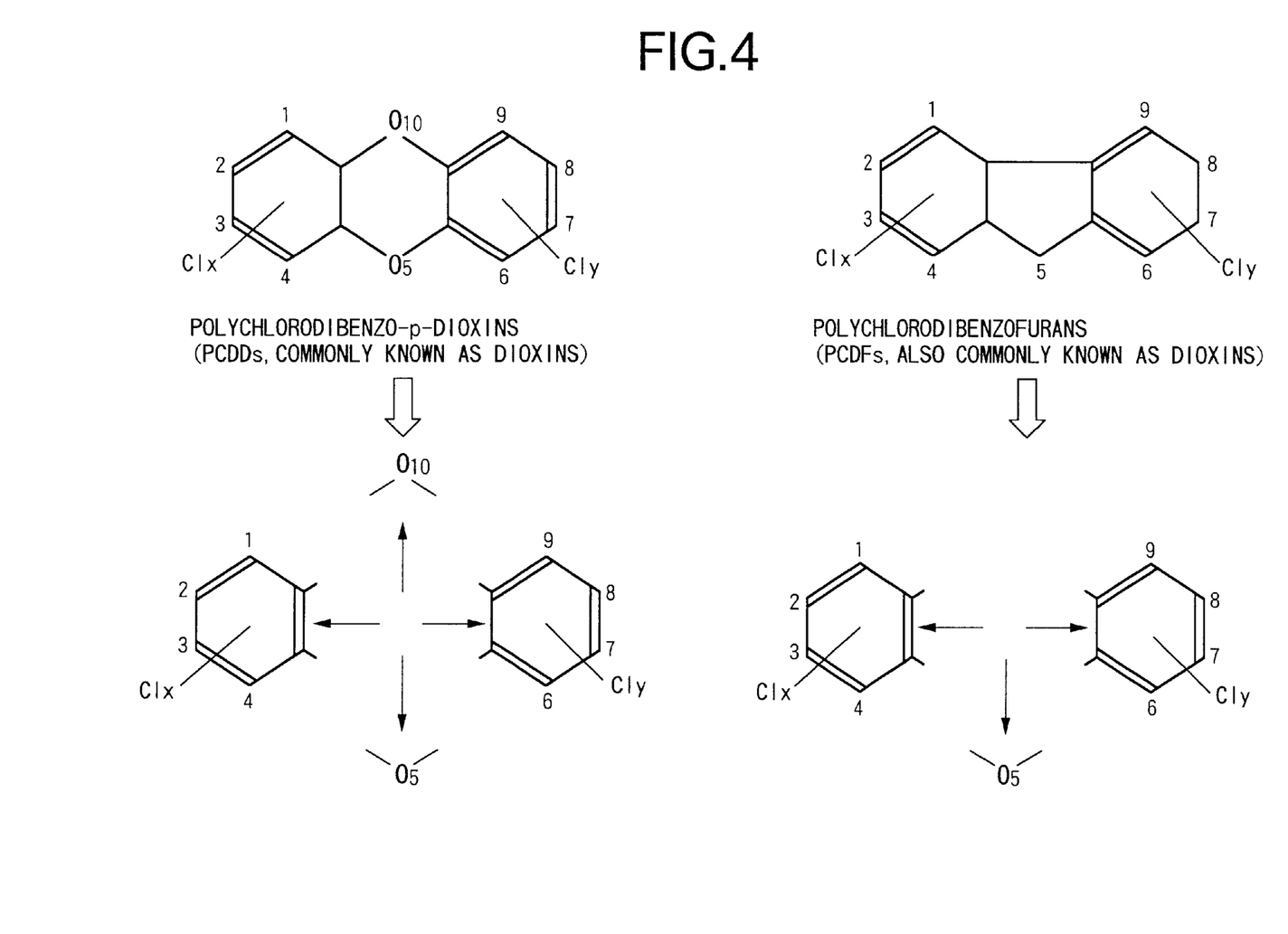
FIG. 4 illustrates the dioxins generally encountered and the patterns of degradation thereof into decomposition products, as well as the molecular structures thereof.

In the upper part of FIG. 4, there are shown the structural formulas of dioxins and homologues thereof. In FIG. 4, the numbers 1 to 10 are international standard numbers indicating the positions of atoms.

In the lower part of FIG. 4, there are shown the modes of decomposition of dioxins. In FIG. 4, $Cl_x$ and $Cl_y$ indicate chlorine (Cl) atoms at x and y atom positions, respectively. This mode of decomposition, too, constitutes an essential part of the constitution of the instant invention and is to be explained in detail later herein.

Dioxins are formed upon combustion of vinyl and like plastic materials, which are petrochemical products, and therefore belong to the class of chlorinated organic aromatic substances.

They are compounds derived from two unit benzene nucleus substances by binding together by means of two oxygen (O) atoms.

Dioxins are heavy oil-like oxidation products having benzene nuclei characteristic of aromatics as resulting from failure to undergo complete combustion/decomposition of the two benzene nuclei.

Among the so-called dioxins, there are polychlorodibenzo-p-dioxins (generally known as dioxins) and polychlorodibenzofurans (generally known as dibenzofurans), as shown in the upper part in FIG. 4.

As is evident from the structural formulas shown in FIG. 4, the term "dioxins" is a generic name for molecules derived from dibenzo-p-dioxin and dibenzofuran by substitution of one to eight chlorine atoms for the hydrogen atom(s) at the position(s) 1 to 10 of the respective basic structures which is(are) available for substitution.

There can exist 16 homologue groups and a total of 210 isomers according to the substitution position(s) and number of substituent chlorine atoms.

Those dioxins which are of general concern include 136 tetra- to octa chlorinated isomers among which there are toxic isomers (17 position isomer s substituted at positions 2, 3, 7 and 8).

The dioxin soot has a particle size of about 10 micrometers, and dioxins are readily soluble in lipophilic solvents and able to bind thereto.

Returning to FIG. 3, the soot (ash) with adhering dioxins, when washed with water 5, gives dioxin-water having a certain extent of concentration, and the dioxin-water and the ash 7 (a considerable amount of dioxins adhering thereto in an oil form) are stored and retained at the bottom of a particulate matter remover 6.

The muddy mixture of dioxin-water and ash (oil-water-ash) 7 is transferred to a first centrifuge (decanter) 12 by means of a pump or the like.

The decanter 12 is rotated at a speed of 3,000 to 5,000 rpm and separates the above mixture, by centrifugal force, into a primary oil-water fraction and a fine, oil-containing ash fraction according to the difference in specific gravity.

The oil-water and fine oil-containing ash so referred to herein are the dioxin-water and fine dioxin-containing ash 7, respectively.

In the decanter 12, the precipitating fine ash is mostly separated. The oil-containing fine ash separated is transferred to an oil-entraining ash tank 20 (FIG. 2) and the oil-water to an oil-water tank 40 in the subsequent water treatment line.

Referring to FIG. 2, the ash collected in the oil-entrainingash tank 20 contains not more than about 3% by weight of an oil fraction adhering thereto and the ash is sent to an ash washing line shown in FIG. 2.

Thus, the ash from the oil-entraining ash tank 20 is transferred to a first washing tank 21, where the ash is admixed with washing water (SKH water) 22 in a mixing ratio of 30%:70% by weight and the mixture is agitated for washing the oil-entraining ash.

This SKH water 22 contains a solvent having a hydrophilic group readily binding to water and a lipophilic group readily binding to an oil. The SKH water 22 is the same as that incorporated into the curtain of water 5. Then, the oil entrained by the ash binds to that lipophilic group and the ash is washed almost to a state of trace concentration (not more than 0.01%) while the entrained oil (dioxins) wholly migrates to the SKH water 22 to form an emulsion (emulsified oil).

This mixture composed of the deoiled ash and the emulsion is separated in a second decanter 23 into the emulsion and deoiled ash. The emulsion is transferred to the same oil-water tank 40 as that shown in FIG. 3 and the deoiled ash to a deoiled ash tank 24.

The ash is transferred from the ash tank 24 to a second washing tank 25 and admixed there first with acid-mixed water 26 (T1) and washed therewith by agitation. Then, in a third decanter 27, the acid-washed mixture is separated into the ash and acidic washing water. The acidic washing water is sent back to the oil-water tank 40 and the ash is returned again to the second washing tank 25.

Then, alkaline water 28 (T2) is added to the second washing tank 25 and the mixture is agitated for washing. The alkali-washed mixture is separated again in the third decanter 27 into the ash and alkaline washing water. The alkaline washing water is sent back to the oil-water tank 40 and the ash is again returned to the second washing tank 25.

Finally the ash is washed with ordinary water 29 (T3) to give a mixture of neutral ash and washing water, the mixture is then separated into the ash and washing water in the third decanter 27, and the ash is sent to a drying line 30 and the washing water to the oil-water tank 40 (T1, T2 and T3 merely denote the order of time).

The ash is dehydrated in the drying line 30 to a water content of not more than 30%. This ash is almost dioxin-free, hence can be dumped outdoors on land or used for land reclamation, without causing any harm.

The dioxin-water from the first decanter 12 (FIG. 3), the water B containing the emulsion after washing the ash (Fog. 2) and the acidic washing water (T1), alkaline washing water (T2) and ordinary washing water (T3) (hereinafter collectively referred to as "washing water and so on") C are transferred to the oil-water tank 40 (C—C, D—D) and then to a water treatment line shown in FIG. 1.

Referring to FIG. 3, the mixture of the above-mentioned different washing water species is sent from the oil-water tank 40 to an adjusting tank 41, where a pH adjusting solution 42 is added to the mixture with agitation and the mixture thus adjusted to a predetermined pH value is allowed to stand for a while.

Meanwhile, the different washing water species contain heavy metals (hereinafter referred to as "mercury and so on") originating from the ash and dissolved therein, though in trace amounts.

While the washing water and so on are treated for pH adjustment, mercury and so on combine with OH in the washing water or pH adjusting water to give metal hydroxides capable of agglomerating. These metal hydroxides take in fine organic and inorganic impurities still remaining in the washing waters and thus become heavier, forming metal hydroxide-impurity binding products (agglomerates), which separate from water and form a precipitate. The precipitate gathers in the lower layer in the adjusting tank 41.

The relatively clear dioxin-water, adjusting water, and metal. hydroxide and so forth (agglomerates) are together transferred from the bottom of the adjusting tank 41 shown in FIG. 3 to a primary electrolyzer 43 (FIG. 1) (E—E).

Before electrolysis, highly toxic dioxins occur in a concentrated form in the dioxin-water in the oil-water tank 40 and adjusting tank 41 shown in FIG. 3, hence care should be used in handling the dioxin-water.

Referring to FIG. 1, a carbon rod 9 is used as the anode and a SUS 10 stainless steel plate as the cathode in the primary electrolyzer 43. A plurality of anodes and of cathodes are disposed alternately and a direct current DC is passed at 3 to 10V. By using carbon as the anode material and stainless steel as the cathode material, it becomes possible to increase the effects of oxidation/reduction.

The transfer of the adjusting water and so on to the primary electrolyzer 43 and the transfer of the treated water to the primary electrolyzer 43 are simultaneously discontinued by stopping an intake pump 11 and a discharge pump 14, respectively, and electrolysis is effected for about 20 minutes while maintaining the quantity (water level) of the adjusting water and so on at a constant level.

On the anode (carbon rod 9), oxygen is generated according to $2H_2O - e = O_2 + 2H_2$ and, on the cathode (SUS 10), hydrogen is generated according to $H_2O + e = H + (OH)$, $2H + 2e = H_2$.

This hydrogen $H_2$ performs reduction and expels the oxygen (O) atoms (at positions 5 and 10) from dioxins as illustrated in FIG. 4 and thereby decomposes the dioxins into two unit benzene nucleus substances (shown in the lower part of FIG. 4) to give a nontoxic oil fraction.

These benzene nucleus substances still have one or more chlorine atoms on carbon atoms thereof and occur as negative ions and therefore are attracted to the anode (carbon rod 9).

In the vicinity of the anode (carbon rod 9), the above oxygen O that has been expelled functions as a catalyst and the chlorine (Cl) atom on each carbon atom in the benzene nucleus substance is ejected to generate chlorine $Cl_2$ and the benzene nucleus substances instead take in the nascent hydrogen H generated around each carbon atom in the adjusting water.

Accordingly, chlorine $Cl_2$, water and a nontoxic oil fraction (aromatic benzene nucleus substances) remain in the primary electrolyzer 43.

Chlorine $Cl_2$ is gaseous and boils and rises from the primary electrolyzer 43. Therefore, it is collected by means of an inverted funnel-shaped cover 8 covering the primary electrolyzer 43 and suctioned by an air fan 15 and sent through a piping into water in a water tank 16.

The chlorine $Cl_2$, which is readily soluble in water, is dissolved in the water tank 16 to give hydrochloric acid having a pH of 2.0 and a concentration of 35%. This is utilized as a chemical. 35% hydrochloric acid is a strong a(id such that upon contact therewith, the skin is inflamed or corroded, while chlorine $Cl_2$ gas is a poison and, when inhaled, it hurts the throat.

Alternatively, it is also possible to produce liquid chlorine by sending the chlorine $Cl_2$ to a cooling vessel (−35° C.) (not shown).

The remaining hydrogen binds with the nontoxic oil fraction (aromatic benzene nucleus hydrocarbons), which is lighter than water, and renders the oil still lighter, and the oil comes up to the liquid surface in the primary electrolyzer 43 and gives an upper layer scum. This upper layer scum is taken out by means of a scraper (not shown) well known in the art and sent to a centrifuge (Sharpness) 13.

The Sharpness 13 is rotated at a high speed of 15,000 to 36,000 rpm and separates the scum into an oil and water according to the difference in specific gravity. The oil is transferred, as a regenerated oil, to an appropriate oil tank and the water is sent to an effluent pool 45 (F—F).

Now, the chlorine $Cl_2$ gas and the water and dense muddy matter collected in the lower layer and containing trace amounts of metal hydroxides and so on and occurring in the primary electrolyzer 43 after removal of the upper layer scum are together transferred to a secondary electrolyzer 33 by means of a discharge pump 14.

In the secondary electrolyzer 33, water-soluble aluminum A134 is used as the anode material and SUS 35 stainless steel plates are used as the cathodes. A plurality of anodes and of cathodes are disposed therein alternately and a DC is passed at 3 to 10 V. By using such aluminum as the anode material and stainless steel as the cathode material in the secondary electrolyzer 33, it becomes possible to increase the inorganic matter removing effect in the secondary electrolyzer 33.

The anode aluminum A134 to be used has a purity of not lower than 99%. Although aluminum Al with a purity of not less than 99% may be used as the cathode as well, it is judicious to use stainless steel plates to thereby reduce the cost. Where aluminum is used as the cathode, the composition of the anode aluminum should be different from that of the cathode aluminum.

According to Faraday's law, the anode aluminum A134 is dissolved at a rate of 0.335 g/A (per ampere), while the cathode SUS 35 generates hydrogen according to $H_2O + e = H + (OH)$, $2H + 2e = H_2$.

The trace dioxins remaining undecomposed in the primary electrolyzer 43 (binding product between emulsion-form SKH water 22 and oil) are decomposed by the reducing action of part of the above hydrogen, in the same manner as mentioned hereinabove, to give a nontoxic oil and a trace amount of chlorine Cl.

The remaining hydrogen binds to the nontoxic oil fraction (aromatic benzene nucleus hydrocarbons), which is lighter than water, and renders the oil still lighter, and the oil comes up to the liquid surface in the secondary electrolyzer 33 and gives an upper layer scum. This upper layer scum is taken out by means of a scraper (not shown) well known in the art and sent to a centrifuge (Sharpness) 13, in the same manner as mentioned above.

There, the scum is separated into an oil and water according to the difference in specific gravity. The oil is transferred, as a regenerated oil, to an appropriate oil tank (for recovering and utilizing the oil) and the water is sent to the effluent pool 45.

Further the anode plate aluminum A134 is dissolved to give $Al^{3+}$, and this $Al^{3+}$ reacts with $(OH)^-$ from the reaction $H_2O + e = H + (OH)$ to give aluminum hydroxide according to $Al^{3+} + 3(OH)^- = Al(OH)_3$.

This flocculant aluminum hydroxide functions as a quick precipitant and takes in the trace chlorine Cl and organic and inorganic contaminants and impurities still remaining in trace amounts in the secondary electrolyzer 33 and becomes heavier.

The resulting agglomerates gradually separate from water and gather in the lower layer in the secondary electrolyzer 33, together with the metal hydroxides and so on transferred from the primary electrolyzer 43.

The middle layer liquid sandwiched between the lower layer agglomerates and so forth and the upper layer scum becomes nearly clear water and is transferred to the effluent pool 45.

First, the lower layer agglomerates and metal hydroxides and aluminum hydroxide are transferred from the secondary electrolyzer 33 to a dehydrator 44.

The dehydrator 44 dehydrates the agglomerates, metal hydroxides and so forth from the secondary electrolyzer 33 to give water and dehydrated cake. The water is sent to the effluent pool 45 and the dehydrated cake to a drier 46. The drier 46 dries the cake to give metal oxides with a water content of not more than 30%, which are to be subjected to metal recycling.

The water in the effluent pool 45 is already clear and, therefore, the upper layer water is drained and, aiming at perfection, the lower layer water, which may possibly contain a trace amount of sludge, is sent again to the oil-water tank 40 (D—D) in the water treatment line.

By conducting the above treatment operations continuously, it is possible to realize the purification of dioxin ash.

The results of analysis of the dioxin-containing emulsion mixture in the oil-water tank 40 before electrolysis as sent to the water treatment line and of the middle layer treated water in the effluent pool 45 after electrolysis are shown below.

The liquid mixture and treated water were submitted to a third party testing institute for analysis.

|  | Total dioxin content | Total dibenzofuran content | Toxicity equivalent |
| --- | --- | --- | --- |
| Treated water | 3.7 ng/l | 5.8 ng/l | 0.061 ng-TEQ/l |
| Liquid mixture | 7,200 ng/l | 14,000 ng/l | 200 ng-TEQ/l |

As is evident from the above comparison, the treated water is already of harmless quality and, therefore, it is drained into a river or used for recycling (neutral ash washing water), and the hydrochloric acid and oil separated and recovered are reused.

Since the first decanter 12, second decanter 23 and third decanter 27 are of the centrifugal type, hence are expensive, compression type ash presses may be used in lieu of them.

Furthermore, when the liquid mixture is low in dioxin concentration, the primary electrolyzer 43 may be omitted and electrolysis is carried out only once by transferring the liquid mixture from the adjusting tank 41 to the secondary electrolyzer 33. In this case, the cost of equipment can be reduced.

EFFECTS OF THE INVENTION

As explained hereinabove, the process and apparatus for eliminating dioxins comprises the steps of washing of dioxin-entraining ash with washing water and subjecting the dioxin-oil-water to electrolysis. In this way, dioxins adhering to incineration ash can be removed from soot in an easy and simple manner and at low cost, and the dioxins can be decomposed into a harmless and useful oil fraction, hydrochloric acid and water, which can then be recovered.

What is claimed is:

1. A process for eliminating dioxins, which are generated from a refuse incinerator and have a structure such that two unit substances having a benzene nucleus are bound together via one or two oxygen atoms and at least one chlorine atom is bound to at least one benzene nucleus, from a mixed gas composed of smoke and ash carrying dioxins adhering thereto, which process comprises the steps of:

passing the above mixed gas through a particulate matter separator and thus passing the mixed gas through a water curtain to thereby cause the dioxin-entraining ash to be taken up in water and discharging only harmless smoke thus separated alone into the atmosphere, separating the resulting mixture of water and dioxin-carrying ash into dioxin-carrying ash and water in a separator, washing the dioxin-carrying ash separated in the above manner with washing water to thereby elute the oleaginous dioxins entrained by the ash to give an emulsion-like oil-water mixture, and separating the resulting mixture, by means of a separator, into ash, which is now dioxin-free, and the emulsion-like oil-water mixture in which dioxins are dissolved, washing the dioxin-free ash first with acidified water, then with alkaline washing water and further with neutral water, to give moist ash and aqueous washings and recovering the ash, combining the water separated from the above-mentioned dioxin-carrying ash, the dioxin-containing emulsion-like oil-water mixture and the above washings and admixing the whole mixture with a pH adjusting solution, to give a liquid mixture, electrolyzing the liquid mixture in a primary electrolyzer equipped with an anode and a cathode to thereby decompose dioxin components into unit benzene nucleus substances and substitute a hydrogen atom(s) for the chlorine atom(s) on the unit benzene nucleus substances, to give a harmless aromatic oil fraction and gaseous chlorine in the upper layer of the electrolyzer, and separating and recovering the aromatic oil fraction and gaseous chlorine, respectively, transferring the dilute liquid mixture remaining after recovery of the aromatic oil fraction and gaseous chlorine and now mainly consisting of water to a secondary electrolyzer equipped with a metal anode and a metal cathode and electrolyzing the mixture therein to generate hydrogen at the cathode as a result of electrolysis of water and a metal hydroxide at the anode, thus decomposing the remaining trace amounts of dioxin components into unit benzene nucleus substances and substituting a hydrogen atom(s) for the chlorine atom(s) on the unit benzene nucleus substances, to give a harmless aromatic oil fraction and a trace amount of gaseous chlorine in the upper layer, and separating and recovering the harmless liquid aromatic oil fraction, allowing the above metal hydroxide to take up those substances that are contained in the dilute liquid mixture as well as the above-mentioned trace amount of gaseous chlorine and thus precipitate in the bottom layer, recovering this precipitate and discharging or draining the middle layer electrolysis liquid.

2. A process for eliminating dioxins as claimed in claim 1, wherein carbon is used as the anode of said primary electrolyzer.

3. A process for eliminating dioxins as claimed in claim 1, wherein stainless steel is used as the cathode of said primary electrolyzer.

4. A process for eliminating dioxins as claimed in claim 1, wherein aluminum is used as the anode of said secondary electrolyzer.

5. A process for eliminating dioxins as claimed in claim 1, wherein stainless steel or aluminum is used as the cathode of said secondary electrolyzer.

6. An apparatus for eliminating dioxins, which are generated from a refuse incinerator and have a structure such that two unit substances having a benzene nucleus are bound together via one or two oxygen atoms and at least one chlorine atom is bound to at least one benzene nucleus, from a mixed gas composed of smoke and ash carrying dioxins adhering thereto, which apparatus comprises:

- a particulate matter separator into which the above mixed gas is introduced to thereby pass the mixed gas through a water curtain for causing the dioxin-entraining ash to be taken up in water and which discharges only the harmless smoke thus separated alone into the atmosphere,
- a first separator for separating the resulting mixture of water and dioxin-carrying ash into dioxin-carrying ash and water, washing water for washing the dioxin-carrying ash separated to thereby elute the oleaginous dioxins entrained by the ash to give an emulsion-like oil-water mixture,
- a second separator for separating the dioxin-freed ash and the emulsion-like oil-water mixture containing dioxins dissolved therein from each other,
- acidified water, alkaline washing water and neutral water, each to be used for washing the dioxin-freed ash in that order and a third separator for separating the mixture resulting from each washing into moist ash and washings for recovering the moist ash,
- a pH adjusting solution to be admixed with a liquid phase resulting from combining together the water separated from said dioxin-carrying ash, the dioxin-containing emulsion-like oil-water mixture and the respective washings to give a liquid mixture having a predetermined pH,
- a primary electrolyzer equipped with an anode and a cathode for electrolyzing said mixture to thereby decompose dioxin components into unit benzene nucleus substances and substitute a hydrogen atom(s) for the chlorine atom(s) on the unit benzene nucleus substances for forming a harmless aromatic oil fraction and gaseous chlorine in the upper layer thereof,
- first recovery means for separating and recovering the gaseous chlorine from the electrolysis mixture formed in said primary electrolyzer and second recovery means for separating and recovering said aromatic oil fraction,
- a secondary electrolyzer equipped with a metal anode and a metal cathode for electrolyzing the dilute liquid mixture remaining after removal/recovery of the aromatic oil fraction and gaseous chlorine and now mainly consisting of water to thereby generate hydrogen at the cathode as a result of electrolysis of water and a metal hydroxide at the anode and decompose the remaining trace amounts of dioxin components into unit benzene nucleus substances and substitute a hydrogen atom(s) resulting from the hydrolysis of water for the chlorine atom(s) on the unit benzene nucleus substances, to give a harmless aromatic oil fraction and a trace amount of gaseous chlorine in the upper layer, and cause said metal hydroxides to take up the trace amount of substances that are still contained in the dilute liquid mixture and said trace amount of gaseous chlorine and precipitate in the bottom layer,
- third recovery means for separating and recovering the harmless aromatic oil from the water in the secondary electrolyzer and fourth recovery means for recovering the metal hydroxides.

7. An apparatus for eliminating dioxins as claimed in claim 6, wherein carbon is used as the anode of said primary electrolyzer.

8. An apparatus for eliminating dioxins as claimed in claim 6, wherein stainless steel is used as the cathode of said primary electrolyzer.

9. An apparatus for eliminating dioxins as claimed in claim 6, wherein aluminum is used as the anode of said secondary electrolyzer.

10. An apparatus for eliminating dioxins as claimed in claim 6, wherein stainless steel or aluminum is used as the cathode of said secondary electrolyzer.

* * * * *